(No Model.)

F. SHUMAN.
PROCESS OF CUTTING WIRE EMBEDDED GLASS.

No. 531,875.  Patented Jan. 1, 1895.

Witnesses:
R. Schleicher
Will. A. Barr

Inventor:
Frank Shuman
By his Attorneys
Howson & Howson

UNITED STATES PATENT OFFICE.

FRANK SHUMAN, OF PHILADELPHIA, PENNSYLVANIA.

PROCESS OF CUTTING WIRE-EMBEDDED GLASS.

SPECIFICATION forming part of Letters Patent No. 531,875, dated January 1, 1895.

Application filed July 25, 1894. Serial No. 518,544. (No specimens.)

*To all whom it may concern:*

Be it known that I, FRANK SHUMAN, a citizen of the United States, residing at Philadelphia, Pennsylvania, have invented a certain Process of Cutting Wire-Embedded Glass, of which the following is a specification.

The object of my invention is to cut wire embedded glass to any shape or size desired. This object I attain in the following manner, reference being had to the accompanying drawings, in which—

Figure 1:
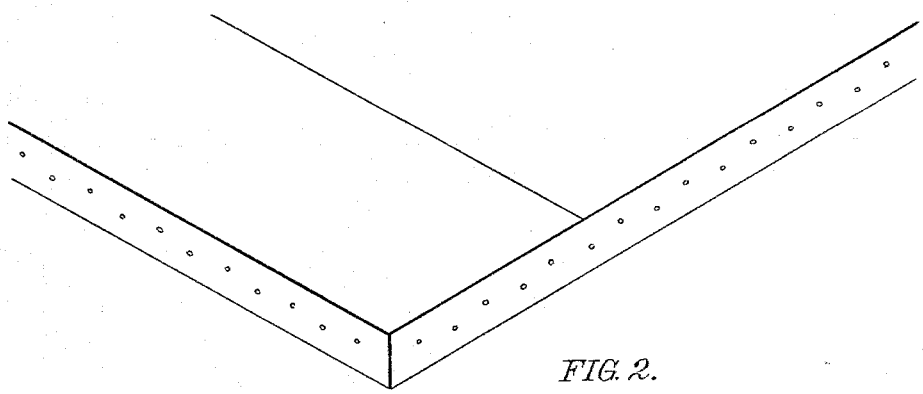
Figure 6:
Figure 6:
Figure 5:
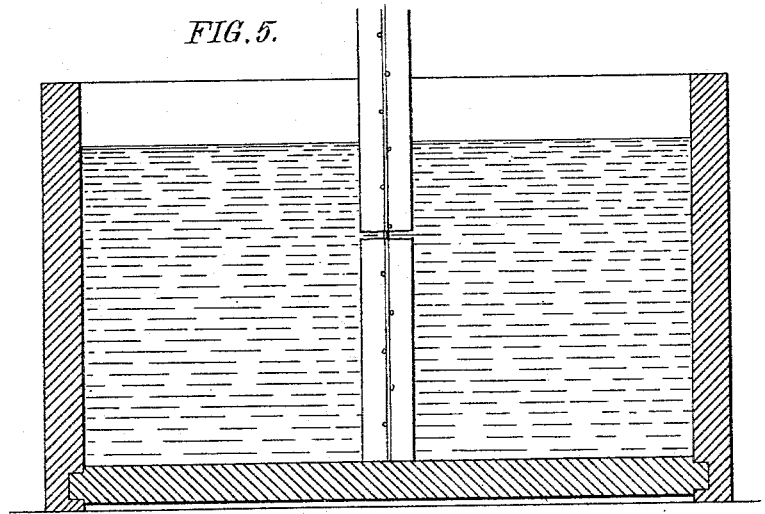

Figure 1, is a perspective view illustrating the first step of the process. Figs. 2, 3, 4 and 5, are views illustrating other steps in the process. Fig. 6, is a sectional view showing the separated glass.

Heretofore in the manufacture of wire glass it has been impossible to cut the glass accurately to any shape or size and the method usually employed has been to make the wire in the first place of the size desired and then remove from the sheet of glass, with the wire embedded therein, the superfluous glass, or to cut the glass and break off in small particles one section leaving the wire exposed and then cutting the wire by nippers, but by my invention I can readily cut the wire embedded glass to any size or shape desired.

Figure 2:
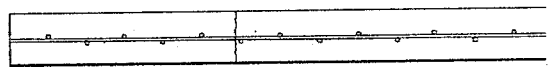
Figure 3:
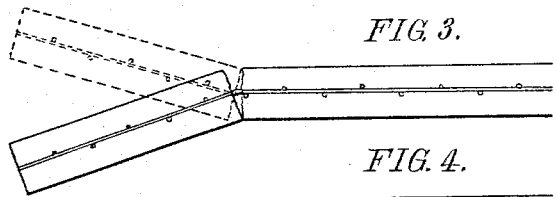
Figure 4:
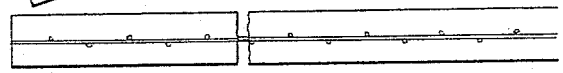

Referring to Fig. 1, of the drawings I scratch the glass on the desired line by means of a diamond or its equivalent. I then crack the glass, as shown in Fig. 2, by the ordinary method of hammering on the under side, but this simply cracks the glass and the wires hold the two sections so tightly together that the passage of liquid is prevented. I then bend one section in respect to the other, as shown in Fig. 3, using one edge of each section as a fulcrum and draw the wire between the two sections so as to separate the sections sufficiently to allow liquid to pass between the sections. I then submerge the cracked portion of the glass in a vat containing acid or other fluid that will attack the metal, and I leave the glass in this bath a sufficient length of time for the acid to eat into the metal so that it will sever or partially sever the wire after which the glass is removed from the bath. If the parts are not already separated a slight movement of one in respect to the other will readily separate the sections, as shown in Fig. 6.

I claim as my invention—

1. The process herein described of cutting wire glass, said process consisting in scratching the glass on the line desired, opening the space between the sections formed by the cracking, subjecting the metal between the sections thus severed to a fluid bath, which will attack the metal and partially or entirely sever it, substantially as described.

2. The process herein described of cutting wire embedded glass, said process consisting in scratching the glass on the line desired by a diamond or its equivalent, second, cracking the glass on this line, bending one section in respect to the other so as to draw the metal between the sections sufficiently for the passage of liquid, immersing the cracked portion in an acid bath and allowing the acid to attack the metal between the sections, substantially as described.

In testimony whereof I have signed my name to this specification in the presence of two subscribing witnesses.

FRANK SHUMAN.

Witnesses:
EDWIN C. FREEMAN,
WILLIAM A. BARR.